United States Patent Office 2,713,003
Patented July 12, 1955

2,713,003

DEHYDRATION OF FOOD PRODUCTS

Eugene J. Rivoche, Washington, D. C.

No Drawing. Application March 9, 1951, Serial No. 214,837. In France October 11, 1941

Section 1, Public Law 690, August 8, 1946
Patent expires October 11, 1961

2 Claims. (Cl. 99—204)

This invention relates to a method of preserving raw or cooked food products by dehydration, and particularly to a method of preparing readily reconstitutable, dehydrated food products in which the food products are given a preliminary conditioning treatment which facilitates removal of the moisture therefrom during a subsequent dehydration operation in which apparatus and methods generally used in the food drying industry may be availed of.

The method of the invention is useful in the dehydration of various kinds of food products, such as vegetables for example, peas, carrots, cabbage, string beans, Lima beans, potatoes, beets, asparagus, etc.; fruits, for example, peaches, apricots, plums, apples, etc.; berries, for example, strawberries, blackberries, gooseberries, etc.; meats and fish.

In accordance with one aspect of the invention, the preconditioning of the food product is obtained by freezing it, either in its raw or cooked state, throughout or superficially, that is, only adjacent its outer surface or skin. The freezing of the food product results in the formation of large numbers of minute ice crystals within and between the cells of the product. The increase in volume of the water particles as they freeze into ice crystals results in the piercing of a large number of the cell walls, as well as the outer surface or skin of the food product, and also results in a penetration and separation of individual fibres of the fibre clusters of the food product. Consequently, when the food product is subsequently subjected to a dehydration treatment, either with or without previous thawing of the food product, the water can better escape therefrom.

The freezing of the food product also results in the liberation of combined or molecular water and thereby assists in its subsequent liberation during the dehydrating operation. This is of particular importance in the dehydrating of meats and fish which do not contain much free water and normally must be subjected to dehydration conditions for long periods of time to bring about the desired dryness of the product. The freezing also is particularly helpful in the removal of water from starchy food products, such as potatoes, peas, Lima beans, etc. During the cooking of such food products much of the free water combines with the starch to form a gel, from which the water can only be removed by diffusion. When the product is frozen before dehydration the water is liberated from the gel and again put into a form in which it readily may be removed. Thus, in all instances, when the product is first frozen and then subjected to dehydration, the desired amount of water may be removed therefrom in a much shorter period of time.

A still further advantage of the freezing of the food product prior to dehydration is that the freezing stabilizes the food product against oxidization when subsequently contacted by the warm or hot gaseous dehydrating medium.

If the food product is frozen throughout, the penetration of the cell walls by the resultant ice crystals will be effective throughout the food product in rendering it more permeable, but if the food product is frozen only adjacent its outer surface or skin, the inner portions will remain unaffected thereby; but in either instance the outer surface or skin will be rendered sufficiently permeable to the passage of moisture to facilitate the evaporation and removal of water from the outer parts of the product during the subsequent dehydration operation, and also to permit the passage of moisture when the food product is reconstituted.

The perforations or fissures of the surface or skin of the food product caused by the formation of the ice crystals adjacent thereto are invisible to the naked eye, but are readily visible under magnification, and are of such size to readily permit the passage of moisture therethrough. Therefore, many food products may be dehydrated while maintaining their original appearance. In such cases the food product may be reconstituted by reabsorption of water through the skin or surface perforations or fissures of their outer surfaces or skins to provide products comparing very favorably to the original fresh or cooked food product, in appearance, taste, flavor, texture, etc.

In accordance with a second aspect of the invention the food product to be dehydrated is first cooked while mixed, preferably in alternate layers, with the same kind of food product which previously has been cooked and dehydrated. The previously cooked and dried product will maintain the respective layers of fresh, uncooked food product separated and will prevent the particles of the product being cooked from sticking to one another. Also, the interposition of the alternate layers of the previously dried product provides adequate channels for the passage of steam through the mass during the cooking process, and for the passage of drying air during the subsequent dehydration operation. Also, when a layer of the previously dehydrated food product forms the bottom of the mass, it will prevent adherence of the mass to drying apparatus, such as a belt, or the like. The water equivalent of the steam which condenses in the layers of previously dried product during the cooking operation is so small that it will have no appreciable moistening effect on the dried product, such as would interfere with its function of providing passages through the mass of material for the steam; or for air during the subsequent dehydrating operation.

The dehydration of the food products is substantially the same regardless of the particular type or species of food product being treated, and also regardless of whether or not the food product is dehydrated from the raw or cooked state.

If a raw food product, such as peas, cabbage, strawberries, is to be dehydrated, it is first washed to remove any foreign matter and then preferably is subjected to a blanching operation which may be done by treating the food product with hot water or steam for a short period of time. Such blanching softens the cellulosic structure of the food product and facilitates its reconstitution (the absorption of moisture) during the cooking operation. In the treatment of some food products the blanching may not be necessary.

After the food product has been washed and blanched, if desired, it is subjected to the action of sulfur dioxide, either in solution or in gaseous form, benzoic acid, salicyclic acid, or other known agent which will stabilize the food product and prevent enzymic action and act as a buffer to maintain substantially the original pH of the food product during subsequent treatment thereof.

The stabilizing treatment of the food product may be carried out, for example, in a cylinder in which sulfur dioxide, either in gaseous or aqueous solution, is injected. If the sulfur dioxide is used in gaseous form it may be injected along with steam. When sulfur dioxide is used as the stabilizing agent, it preferably will be used in concentrations of about 0.1% or 0.2%. In many instances it may be found advantageous to conduct the stabilization of the food product simultaneously with the blanching operation.

If the food product is one of substantial size, such as carrots or beets, it preferably is sliced or otherwise reduced to smaller particles in order to facilitate the subsequent freezing and dehydration thereof.

The food products are now subjected to the desired freezing operation and as previously indicated may be frozen throughout or only superficially, that is, adjacent their outer surface. The freezing may be obtained by any well-known method of freezing food products and the like. Advantageously they are frozen by subjecting them to cold air. However, in many instances the use of freezing brine or other freezing solutions may be used. If the freezing of the food product is accomplished by means of a freezing solution, it subsequently is washed to remove freezing solution which does not drain from the surface thereof.

If the particles of food product have agglomerated during the freezing operation, they may be separated in any well-known manner into particles of a desired predetermined size before subjecting them to further treatment.

After the food product has been frozen, it is subjected to a dehydration treatment. Such dehydration may take place while the food product is still frozen, or the food product first may be permitted to thaw and then subjected to the dehydration operation.

When the food product is dehydrated without previous thawing, it advantageously is subjected to a stream of air which may be at any desired temperature, preferably from room temperature up to 300° F. or even higher. However, the temperature of the air should be such as to avoid carbonization of the food product. The temperature of the dehydrating air, the quantity thereof and the speed of its movement over the food product should be so correlated with the rate of thawing and the amount of food product that the moisture is absorbed or taken up by the air substantially as fast as it thaws. If the thawing of the food product is faster than the absorption of the water produced by the dehydrating air, moisture will accumulate on the surface of the particles of the food product, which tends to make the food product sticky so that agglomerates are formed which prevent proper free circulation of air through the mass of particles of the food product. On the other hand, if the thawing of the food product is so slow that it does not result in the supplying of moisture to the surface of the particles of the food product substantially as fast as it can be removed by the drying air, the drying effect at the surface of the food particles is too rapid and there is a tendency for the air to form a hard skin or crust on the surface of the particles of the food product which interferes with their drying and generally is objectionable. If the quantity, temperature and speed of movement of the air over the particles of food product are properly correlated to the rate of thawing and the amount of the food product, there will be a gradual thawing of the product and a gradual and continued transfer of the moisture from the inside to the surface of the product without the formation of any skin or crust on the particles and without excess water forming on their surfaces such as would tend to make the particles stick to one another.

It is possible to use air at a temperature of 300° F. or higher because of the continued cooling effect at the surface of the food particles due to the rapid evaporation from the inside of the product at the surface which continually lowers the surface temperature of the particles of the food product.

The drying operation is continued until the moisture content of the food product has been reduced to about 5% to 12% of the original moisture content thereof. However, in the case of some vegetables, such as carrots, it is not necessary to reduce the moisture content to less than about 15% of the original moisture content in order to obtain a dehydrated product which is satisfactorily preserved.

In some instances it is advantageous to admix with the frozen particles of the food product to be dehydrated an amount of the same food product which previously has been dehydrated. Such returned previously dried product may be admixed with the frozen food product to be dried in any amount up to 100% or even more by weight of the amount of the frozen food product to be dehydrated. Such previously dried food product will physically separate the frozen particles and absorb any moisture which may appear at the surface of the frozen particles of food product and thus prevent possible sticking of the frozen particles to one another during the dehydration operation. Such returned previously dried food product may be homogeneously mixed with the particles of the frozen food product, or, preferably, are arranged in alternate layers with the particles of the frozen product, in which case, the previously dried product will preferably form an outer layer in order to prevent the mass of the product from sticking to the drying apparatus.

The dehydration of the frozen food product may be conducted in any well-known type of drier, for example a cylinder drier, a drum drier with stirrers, a gas pervious belt drier, or the like. If the drying takes place on a belt drier, suitable means preferably are provided for causing agitation or dancing of the particles thereon.

Instead of subjecting the frozen food product to dehydration in a type of drier such as that just indicated, the drying may be conducted in a centrifuge so arranged that hot air is passed through the frozen food product during the dehydration thereof. In such case, the centrifuging tends to physically remove the water from the food product as fast as the ice particles thaw.

When the frozen food product is subjected to dehydration in a centrifuge, the mixing therewith of a portion of like food product which previously has been frozen and dehydrated is quite important, since such previously dehydrated product acts to physically separate the frozen particles and to form channels for the passage of the water as fast as it is formed. In such a mixture the previously dehydrated food product does not absorb any appreciable amount of moisture since the moisture is liberated substantially as fast as formed from the centrifuge due to the centrifuging action and the dehydrating action of the hot air passing therethrough.

Instead of dehydrating the food product while it is in the frozen state, it first may be thawed and then dehydrated. In such an operation the freezing imparts a new physical structure to the food product in that (1) the combined or molecular water of the substance of the food product is partially liberated by the freezing operation to form free water in the product which subsequently is more readily removed, which is particularly important in connection with the dehydration of starchy food products, and also meats and fish which normally must be subjected to long periods of drying in order to remove a sufficient amount of the combined water, and (2) the formation of ice crystals between the cells of the structure during the freezing operation separates the cells from one another and also results in the rupturing of some of the cells, both of which enable both the free and freed molecular water within the cells and between the cells, after thawing, to be more readily removed during the dehydrating operation. Otherwise the drying of the food product after thawing is substantially the same as the dehydration of the food product from its frozen state.

Previously dehydrated food of like character advantageously can be admixed with the raw food product after thawing, or with the cooked food product in those instances, e. g., Lima beans, peas, etc., where the cooked product is sufficiently firm to withstand such mixing without destruction of its physical form, the same as it can be admixed with the particles of the frozen food product. This is particularly desirable when the thawed food product is treated with the gaseous dehydrating agent simultaneously with the centrifuging thereof, since the particles of previously dried food product act as a mechanical separator for particles of thawed and moist food product and prevent the formation of a layer of the thawed product on the centrifuge through which the gaseous dehydrating medium could not readily pass.

A product dried after a freezing operation as described above is more readily reconstituted than is one which is dried without freezing, since the capillarity of the cellular structure is better preserved so that water to reconstitute the product may be taken up at a much faster rate.

When desired, the food product may be cooked before being subjected to the freezing and dehydrating operations. In this connection, a product is considered as being fully cooked when it has reached the desired degree of softness, that is, when the cellular structure of the product has been rendered sufficiently soft by the cooking action.

When the method of the present invention is applied to cooked food products, the operation is substantially the same as described above except that the stabilization of the food may take place either during the cooking operation or as a subsequent step, and also, if the food product is a leafy one, such as lettuce or cabbage, it preferably is formed into layers of from about one-half inch to one inch in thickness before being frozen, or else is frozen in a thin layer on a freezing cylinder or drum to form layers of such thickness, or frozen flakes of the cooked product. When the cooked product is mixed with previously frozen and dehydrated food product of like character, it will be of the food product in its cooked state.

Many foods when cooked become too soft to retain their form during a mixing operation. In such cases, the cooked food product is first frozen to impart firmness to it and is then mixed with the desired amount of the previously dehydrated food product.

In accordance with the second aspect of the invention, the food product to be dehydrated prior to the cooking operation is mixed with previously cooked and dried product of like character, and preferably by arranging the cooked and previously dried product in alternate layers in the cooking vessel. When the uncooked food product is so mixed with the previously dehydrated food product, the previously dried product maintains the uncooked food product separated so that during the cooking operation the particles of uncooked food product will not adhere to one another. The cooking of the food product, when admixed with the previously dehydrated food product of like character, may be obtained by steam, hot air, dielectric heating, or any form of heating, which will not add a substantial amount of water to the cooking vessel, such as would appreciably add water to and soften the previously dehydrated food product. When steam is used as the cooking agent, only a relatively small amount is necessary to carry out the cooking of the uncooked food product, and the water equivalent of the steam which is condensed in the previously dehydrated food product will be insignificant since such amount of water will not be enough to appreciably moisten and soften the previously dried product. When the cooking is obtained by means of hot air, dielectric heating, or the like, the steam resulting from the generation of heat in the uncooked food and the flavor substances which are liberated will be largely absorbed or taken up by the previously dried product, but the amount of steam which is liberated during the cooking operation will not be sufficient to appreciably soften the dried product or appreciably affect its separating function in the mixture.

The amount of previously dehydrated food product which is admixed with the uncooked food product may vary from about 10 to 100 parts or more by weight of the previously dehydrated food product per 100 parts by weight of the uncooked food product. While the use of as little as 10% of the previously dehydrated product tends to maintain the particles of the uncooked food product separated and to provide passages for steam during the cooking operation and also passages for air during the subsequent dehydration operation, I normally admix not less than 20% of the previously dehydrated food product with the uncooked food product, and preferably at least 50% or 60% by weight of the uncooked food product.

The previously dehydrated food product will absorb from the uncooked food product, during the cooking operation, the moisture which appears at the surface of the particles thereof so that the resulting mixture may be better handled and maintained in the form of discrete particles during the subsequent dehydrating operation. Also, the mixing of previously dehydrated food product with the uncooked food product during the cooking operation has the further advantage of preventing loss of juices, etc., from the food undergoing cooking, since such juices, etc., when volatilized from the uncooked food during the cooking operation will be absorbed by the previously dehydrated food product.

The cooked admixture of food product as described above may be subjected to the dehydrating operation either with or without prior freezing thereof. However, it is preferred that the cooked admixture be frozen before it is dehydrated since the freezing transforms the soft cooked particles of the food product into firm hard particles which are resistant to damage during subsequent handling, and causes the particles to maintain their discrete form. The freezing of the cooked mass further permits the mixing back of previously dried like food product in those instances where only a relatively small amount of the previously dehydrated product was admixed with the uncooked food product during the cooking operation, or where the food product was cooked without first being admixed with any of the previously dehydrated food product. The admixed previously dehydrated food product provides a mixture quite suitable for air drying in that the particles of previously dehydrated food product provide the necessary channels or passages through the mass of material to enable the gaseous dehydrating agent to pass therethrough.

The admixture of previously dehydrated food product with the uncooked food product prior to cooking, or, in some instances, where the cooked product has a desired rigidity or firmness, the admixture thereof with the food product after cooking, and before the freezing operation, results in the frozen mass being much more readily broken up into particles suitable for the dehydrating operation, since the previously dried product absorbs only a relatively small amount of water and does not freeze to hard masses which offer great resistance to breakage. Consequently, a frozen mass of the admixed material may be broken into suitable size for the dehydrating operation merely by passing it between a pair of rotating cylinders or rolls.

In those cases when it is desired that the food product, cooked in the manner described above, shall have a reduced moisture content, and be of firmer texture, or where the cooked and dehydrated product is desired in powdered form, it is preferred that instead of admixing particles of the previously dehydrated product of substantial size to the food product to be cooked, the previously cooked and dehydrated product shall be reduced to a powder before admixing with the uncooked product, and the resulting mixture preferably stirred gently during the cooking operation. The powdered product has much greater absorbing power than do particles of larger size, and will absorb much more of the moisture, flavors, etc., from the product being cooked, so that the cooked product will be correspondingly drier and firmer. The use of the previously dehydrated product in powdered form is particularly desirable in the dehydration of cooked starchy materials, such as potatoes, when the cooked dehydrated potatoes are desired in powdered form. Also, the subsequent dehydration of the cooked product will be appreciably facilitated because of the reduced moisture content and the firmness of the product, and the property of powder on the surfaces of the cooked particles maintaining such particles separated from one another and preventing them from forming into agglomerates through which the gaseous dehydrating medium can not readily pass. The use of the previously dehydrated food product in powdered form is also advantageous, in some instances, when the cooked product is frozen prior to the final dehydration operation, since it performs the same separating function with respect to the particles when they are subsequently thawed and while subjected to the final dehydration operation.

When it is desired that the final dehydrated product shall be in the form of slices, or pieces, which may be in diced form, it is often desirable that the returned previously dehydrated product which is admixed with the food product to be cooked shall be partly in powdered form and partly in the form of larger particles. In such cases, the returned powder readily absorbs moisture from the particles of food product during the cooking operation, while the particles of larger size maintain a spacing of the cooked particles which facilitates the final drying manipulations and the passing of the gaseous dehydrating medium through the mass.

The relative amount of the food product in powdered form to the amount of food particles in larger pieces may vary widely as long as the amount of the product in powdered form is sufficient to reasonably well cover the surfaces of the food product to be cooked, and may be in substantially equal amounts.

The dehydrating of the food product, cooked as described above, may be conducted in the same manner as previously described in connection with the dehydration of the raw food product or the food product which is cooked without first being admixed with previously dehydrated food product of like character.

When the dehydration of the food product of the present invention is carried out with meats and fish, the meat or fish preferably will first be formed into slices of from about one-fourth to one-half inch in thickness, and advantageously after such slices have been cut into small pieces of approximately one inch square.

The present method of dehydrating food products of various kinds is particularly desirable in that the resulting product retains its natural color, taste and flavor and does not undergo chemical change during the dehydrating operation. Also, there is no enzymic action or fermentation or other decomposition of the product, particularly when the food product is first given a stabilizing treatment with sulfur dioxide, benzoic acid, salicylic acid or other known stabilizing agent. Therefore, the dehydrated product may readily be reconstituted by the mere addition of moisture to give a food product comparing favorably in color, taste, flavor and texture with the natural food product.

This application is directed, in part, to the same subject matter as application Serial No. 10,914, filed February 25, 1948, now abandoned, and application Serial No. 10,913, filed February 25, 1948, now Patent No. 2,565,942.

I claim:

1. In the dehydration of solid foodstuffs, the step of rendering permeable the outer surface of the foodstuff which comprises exposing said substance to a cooling medium at a temperature sufficiently low to rapidly lower the temperature of the outer layer of said substance to a temperature substantially below the freezing point of the liquid content of said layer, maintaining the foodstuff in heat exchange relationship to the cooling medium for a length of time sufficient only to freeze the liquid content in said outer layer to produce minute frozen particles of crystalline form immediately below the surface of said substance, which frozen particles pierce said surface, the portion of said food stuff inwardly of the outer layer being maintained at a temperature above its freezing point, and thereafter raising the temperature of said outer frozen layer sufficiently to cause said frozen particles to melt.

2. In the dehydration of fruits and vegetables, the step of rendering permeable the skin thereof which comprises exposing said fruits and vegetables to a cooling medium at a temperature sufficiently low to rapidly lower the temperature of the skin and the subcutaneous layer of said fruits and vegetables to a temperature substantially below the freezing point of the droplets of liquid contained in said subcutaneous layer, maintaining the fruits and vegetables in heat exchange relationship to the cooling medium for a length of time sufficient only to freeze the liquid content of the skin and subcutaneous layer to produce minute frozen particles of crystalline form in said subcutaneous layer, which particles pierce said skin, the portion of said fruits and vegetables inwardly of the outer layer being maintained at a temperature above its freezing point, thereafter exposing said partially frozen fruits and vegetables to a warming medium, and raising the temperature of said frozen skin and subcutaneous layer sufficiently to cause said frozen liquid particles to melt.

References Cited in the file of this patent

UNITED STATES PATENTS

| | | |
|---|---|---|
| 2,490,951 | Dunkley | Dec. 13, 1949 |
| 2,520,891 | Rivoche | Aug. 29, 1950 |